United States Patent [19]
Tobiasz et al.

[11] Patent Number: 5,787,790
[45] Date of Patent: Aug. 4, 1998

[54] ACTUATOR WITH AN OVERFLOW CHAMBER AND MEANS FOR RETURNING THE FLUID FROM THE OVERFLOW CHAMBER DURING A REVERSE STROKE

[75] Inventors: Andre Tobiasz, Epinay sur Seine; Remy Vo, Orleans; Paul Platteaux, Sougy, all of France; Richard Nix, Ortonville, Mich.

[73] Assignee: Automotive Produscts, plc. Leamington Spa, England

[21] Appl. No.: 700,486

[22] PCT Filed: Dec. 27, 1995

[86] PCT No.: PCT/EP95/05141
§ 371 Date: Oct. 17, 1996
§ 102(e) Date: Oct. 17, 1996

[87] PCT Pub. No.: WO96/21117
PCT Pub. Date: Jul. 11, 1996

[30] Foreign Application Priority Data

Jan. 5, 1995 [GB] United Kingdom ............... 9500126

[51] Int. Cl.[6] .................................................. F01B 31/00
[52] U.S. Cl. ........................................... 92/86; 92/107
[58] Field of Search .............................. 92/80, 82, 86, 92/107, 98 D

[56] References Cited

U.S. PATENT DOCUMENTS

| | | | |
|---|---|---|---|
| 2,194,209 | 3/1940 | Mott | 92/80 |
| 3,293,994 | 12/1966 | Napolitano | 92/86 |
| 3,584,331 | 6/1971 | D'Hooge | 92/86 |
| 3,972,396 | 8/1976 | Bochnak | 92/86 |
| 4,036,112 | 7/1977 | Hubschmann | 92/82 |
| 4,509,409 | 4/1985 | Reeves | 92/80 |
| 4,870,821 | 10/1989 | Harada et al. | 92/80 |
| 4,887,515 | 12/1989 | Tabata | 92/82 |

FOREIGN PATENT DOCUMENTS 1590050 5/1981 United Kingdom ............ 92/86

*Primary Examiner*—Thomas E. Denion
*Attorney, Agent, or Firm*—Paul E. Milliken; Lee A. Germain

[57] ABSTRACT

An actuator, particularly for the operation of a vehicle clutch in which an annular piston (10) slides between cylinder walls (11, 12) to define an annular working chamber (20). A sealing means (15) seals the piston to the cylinder walls and an overflow chamber (26, 27) retains any fluid which leaks past the sealing means from the working chamber. A return means (28) is also provided for returning fluid from the overflow chamber when the piston is not undertaking a working stroke.

10 Claims, 6 Drawing Sheets

ACTUATOR WITH AN OVERFLOW CHAMBER AND MEANS FOR RETURNING THE FLUID FROM THE OVERFLOW CHAMBER DURING A REVERSE STROKE

This invention relates to actuators hereinafter referred to as actuators "of the kind specified" in which an annular piston defines an annular working chamber in combination with co-operating cylinder walls, the piston being axially displaceable relative to the cylinder walls by pressurisation of fluid within the working chamber.

Actuators of the kind specified are used for a variety of purposes but are particularly suitable for the actuation of a vehicle clutch release bearing when the actuator can be installed concentrically around a gearbox input shaft of the vehicle.

Problems arise with such actuators in that actuating fluid leaks past seals which seal the piston to the cylinder walls and can then contaminate the associated clutch. Also, on rapid movements of the piston, or sudden depressions in the fluid pressure in the working chamber, air may be drawn into the working chamber past the piston seals.

It is an object of the present invention to provide an actuator of the kind specified which is less susceptible to leakage and to the ingress of air.

Thus according to the present invention there is provided an actuator of the kind specified having sealing means for sealing the piston to the cylinder walls, an overflow chamber which retains any fluid which leaks past the sealing means from the working chamber, and return means for returning fluid from the overflow chamber when the piston is not undertaking a working stroke.

The return means may comprise valve means which controls communication between the working chamber and over flow chamber, the valve means opening up communication between said chambers when the piston is not undertaking a working stroke.

Such an actuator is less susceptible to leakage and air ingress since the overflow chamber retains any fluid which leaks past the seals and the valve means enables the piston to such back fluid into the working chamber from the overflow chamber instead of sucking in air.

The valve means may conveniently be built into the sealing means.

For example, pressurisation of the working chamber may cause deflection of the sealing means to close-off communication between the working and overflow chambers.

Alternatively the return means may comprise a valve means separate from the sealing means, said valve means being arranged to be normally biased to a closed position but being opened on a return stroke of the piston following a working stroke.

The overflow chamber may be defined by diaphragm means in combination with the walls.

In an arrangement in which the piston is displaceable between inner and outer cylinder walls one diaphragm may extend between the piston and the inner cylinder wall and a second diaphragm may extend between the piston and the outer cylinder wall.

In an alternative arrangement the overflow chamber may be defined by a diaphragm means and a portion of the outer cylinder wall, passageway means being provided to direct any fluid which leaks past the sealing means to the overflow chamber.

Where the actuator is to be used to operate a vehicle clutch a clutch release bearing is carried by the piston.

Several embodiments of the present invention will now be described, by way of example, with reference to the accompanying drawings in which.

Figure 1:
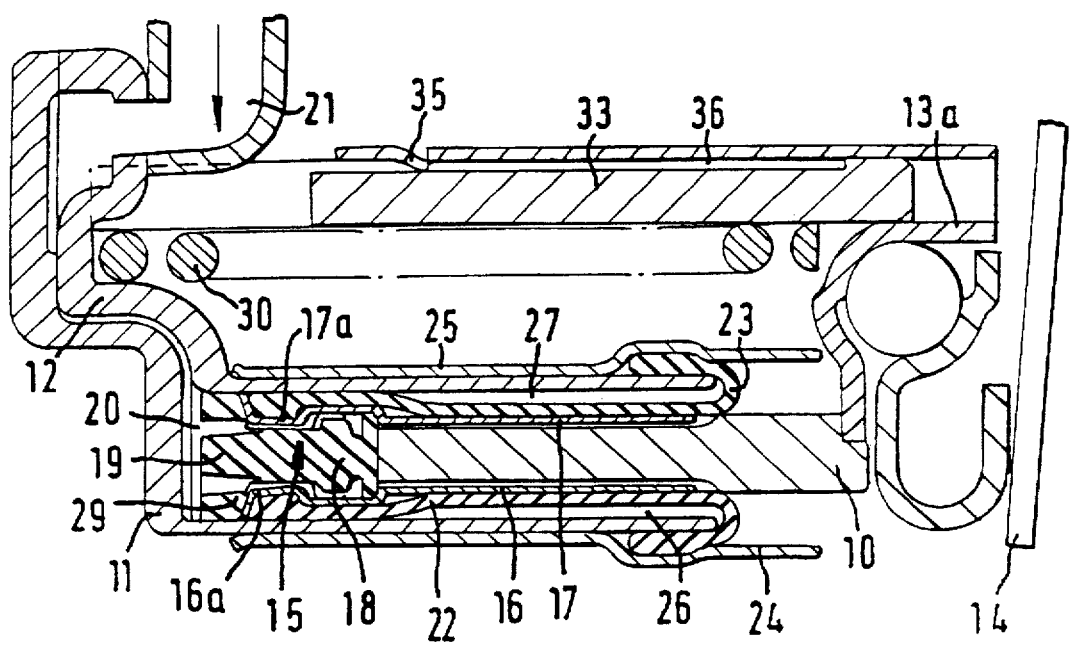
FIG. 1 is a radial section through an actuator according to the present invention for the operation of a vehicle clutch.
Figure 1:
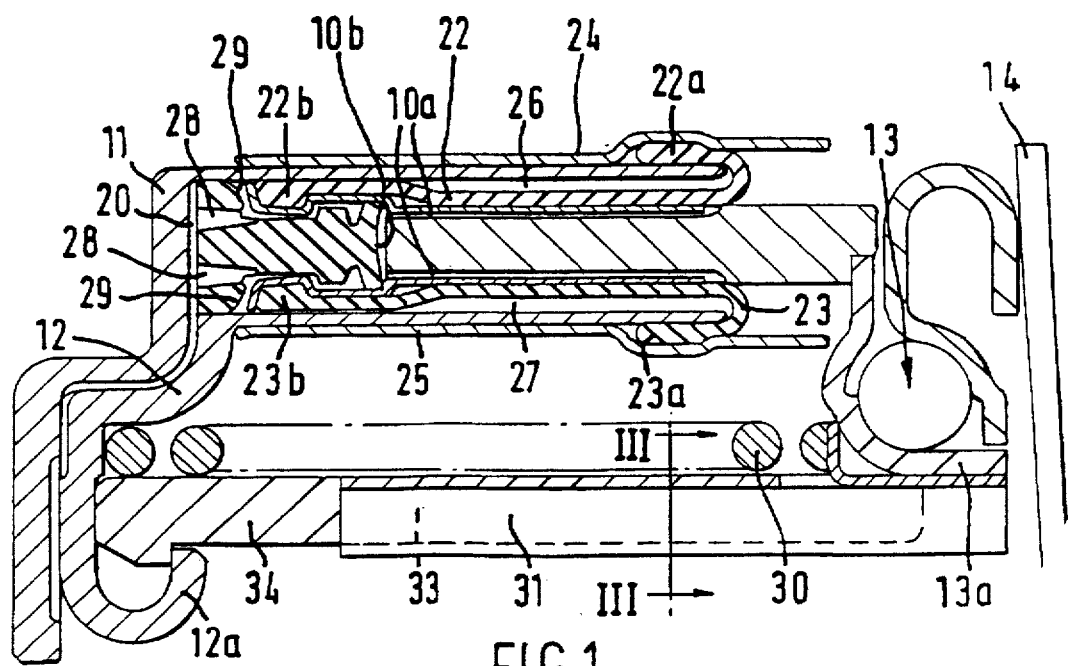

Referring to FIG. 1 this shows a vehicle clutch actuator in which an annular piston 10 is displaceable between an inner cylinder member 11 and an outer cylinder member 12. Piston 10 carries a clutch release bearing 13 which operates, for example, the diaphragm spring 14 of an associated clutch (not shown). A spring 30 acts between outer cylinder member 12 and release bearing 13 to maintain a pre-load on diaphragm spring 14.

Mounted on the left hand end of piston 10 is a combined sealing and valve member 15 which is held in position on piston 10 by inner and outer sheet metal rings 16 and 17 which restrain a base portion 18 of the sealing member 15.

A head portion 19 of the sealing member 15 is disposed in a working chamber 20 defined by the sealing member and the inner and outer cylinder walls 11 and 12. Pressurised fluid may be admitted to working chamber 20 via an inlet 21 from an associated clutch operating master cylinder or other source of fluid pressure (not shown) in order to displace piston 10 to the right and hence disengage the associated clutch.

Extending between the piston 10 and the inner and outer cylinder members 11 and 12 are two rolling lobe diaphragms 22 and 23 respectively. A bead 22a of diaphragm 22 is secured to inner cylinder member 11 by an inner sheet metal ring 24 and a bead 23a of diaphragm 23 is secured to outer cylinder member 12 via an outer sheet metal ring 25.

Diaphragms 22 and 23 are constrained to move axially with piston 10 by portions 16a and 17a of rings 16 and 17 which entrap bead portions 22b and 23b of these diaphragms.

Thus overflow chambers 26 and 27 are defined by either side of piston 10.

Figure 2:
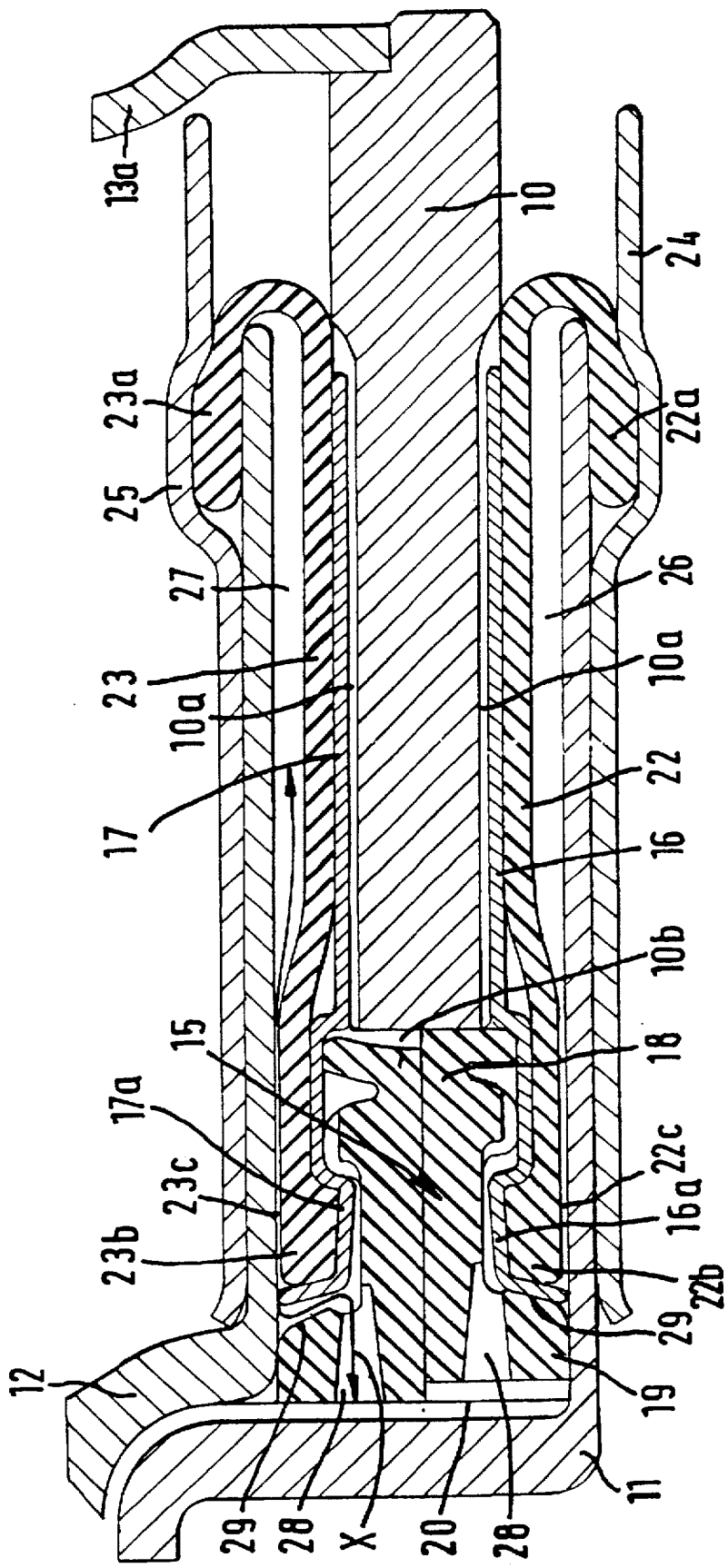
FIG. 2 shows half of FIG. 1 on a larger scale with half of the actuator seal shown in its open position and the other half in its closed position.

Head portion 19 of sealing member 15 is provided with axially extending openings 28 through which fluid can flow from working chamber 20 into and out of overflow chambers 26 and 27 along flow paths X shown open in the bottom half of FIG. 1 and also in the top half of the seal arrangement of FIG. 2. As can be seen from FIG. 2, flow paths X are via flutes 22c and 23c in the outer surface of diaphragms 22 and 23.

When the pressure within working chamber 20 increases in order to move piston 10 to the right to operate diaphragm spring 14, the pressure in working chamber 20 displaces the sealing member 15 to the right relative to piston 10 so that the base portion 18 of sealing member 15 occupies the position shown in the top half of FIG. 1 in which sealing surfaces 29 on the head portion 19 of the sealing member close-off flow path X by contact with the adjacent portions of rings 16 and 17. The ability of sealing member 15 to move to the right is ensured by passages 10a in piston 10 which place chamber 10b beneath the base portion 18 of sealing member 15 in communication with the atmosphere.

Thus when piston 10 is being displaced to the right whilst undertaking a working stroke the communication between working chamber 20 and overflow chamber 26 and 27 is closed-off so that diaphragms 22 and 23 are not exposed to the full operating pressure within working chamber 20.

When the working pressure in chamber 20 is released and the piston 10 is retracted, sealing member 15 assumes the non-deformed condition shown in the lower half of FIG. 1 in which communication between overflow chambers 26 and 27 and working chamber 20 is again restored so that any fluid which has leaked into overflow chambers 26 and 27 around the head portion of sealing member 15 can flow back into working chamber 20. As will be appreciated, should piston 10 make any rapid movement, or a rapid depression in working chamber pressure occur, which might tend to draw air into working chamber 20, this will then simply result in fluid being sucked into working chamber 20 from overflow chambers 26 and 27.

In normal operation of the actuator overflow chambers 26 and 27 are full of actuating fluid and any leakage of fluid past sealing member 15 during a given working stroke of piston 10 is accommodated by slight stretching of the diaphragms 22 and 23. This fluid which has leaked past sealing member 15 is returned to working chamber 20 on the next opening of flow paths X when chamber 20 is depressurised.

Figure 3:
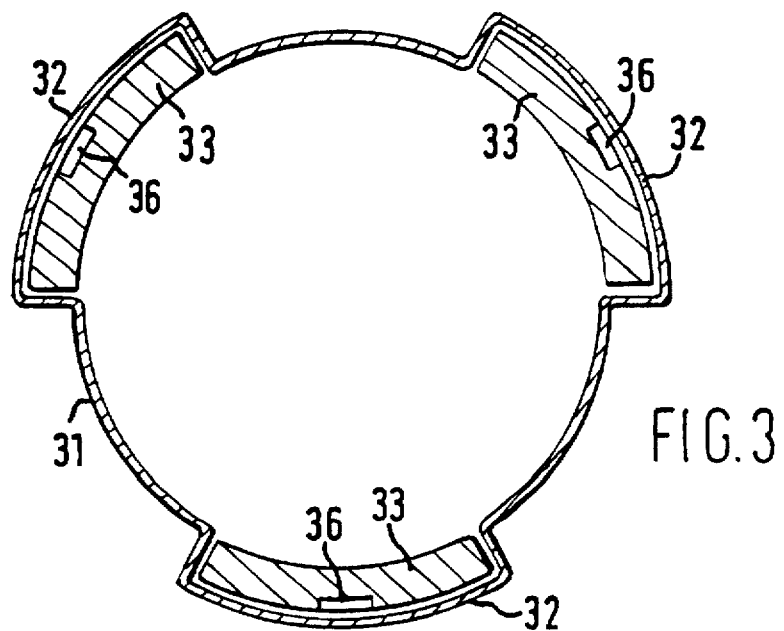
FIG. 3 is a section on line III—III of FIG. 1.

FIG. 3 shows the manner in which rotation of piston 10 relative to outer cylinder member 12 is prevented. As can be seen from FIG. 3, an outer sheet metal guide member 31 is secured to the outer race 13a of release bearing 13 which is also non-rotatably secured to piston 10. Guide member 31 is provided with castellations 32 which engage legs 33 formed on an outer plastics sleeve member 34 which is secured to outer cylinder member 12 via rolled proportion 12a. The total axial displacement of release bearing 13 is also controlled by tangs 35 formed in guide member 31 which extend into slots 36 in legs 33.

Figure 4:
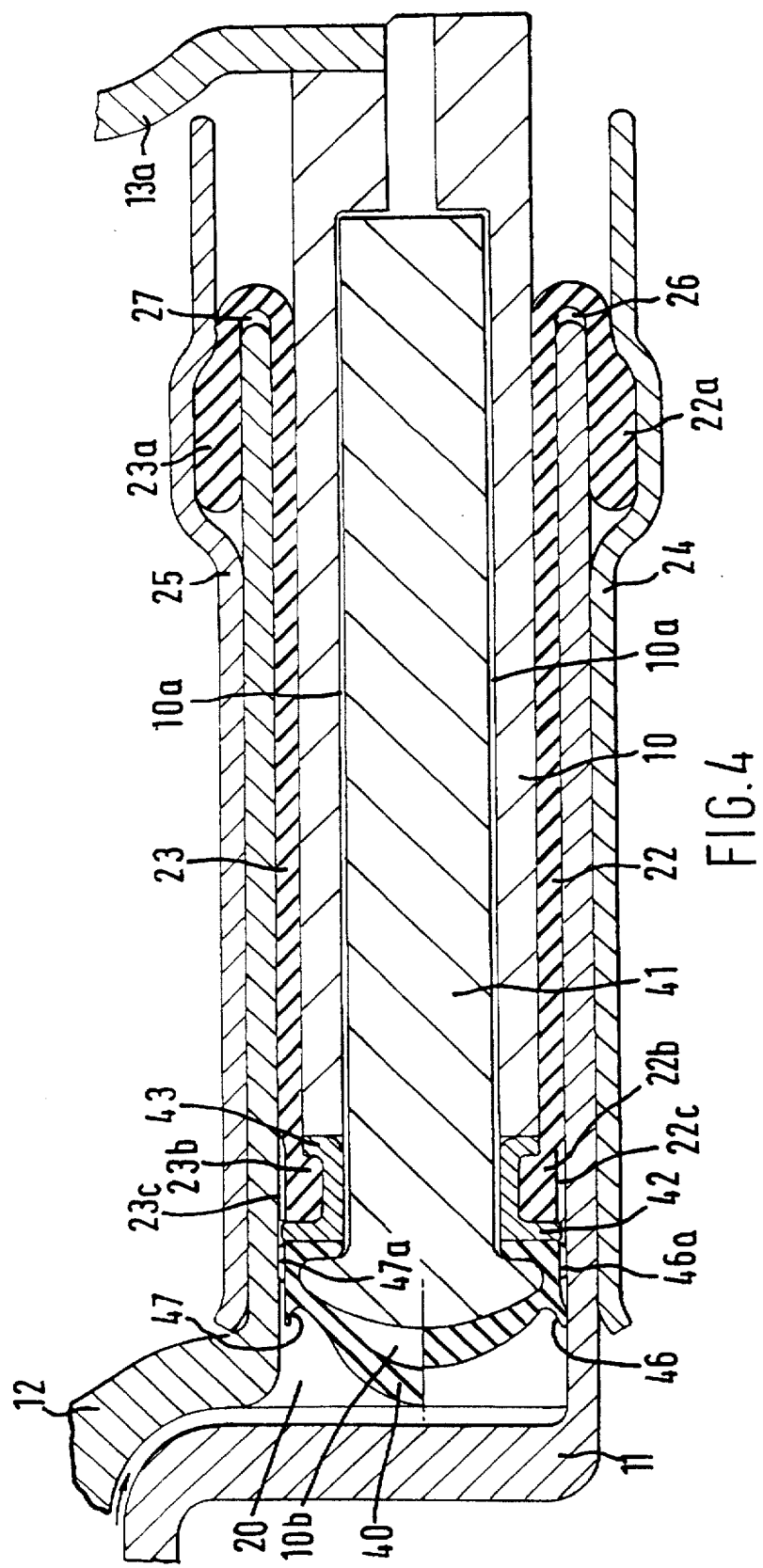
FIG. 4 shows a similar view to FIG. 2 with an alternative sealing/valve arrangement.

FIG. 4 shows an alternative sealing arrangement in which annular piston 10 carries a sealing member 40 which is retained on piston 10 by an annular retaining member 41 which is an interference fit in an annular groove 42 in piston 10. Retaining member 41 also retains diaphragm gripping rings 42 and 43 in position on piston 10.

As can be seen from FIG. 4, sealing member 40 is provided with two sealing lips 46 and 47 for engagement with cylinder members 11 and 12 respectively.

The lip 47 is shown in FIG. 4 in its undeflected condition which it occupies when the fluid pressure in the working chamber 20 is low. When the pressure in chamber 20 is increased in order to move piston 10 to the right the seal 40 and its lips 46 and 47 are deflected by the fluid pressure to the position shown occupied by the lip 46 in FIG. 4. This seals off the communication between overflow chambers 26 and 27 so that the diaphragms 22 and 23 are again not subjected to the full pressure developed in working chamber 20. The ability of seal 40 to deflect is ensured by connecting chamber 10b beneath seal 40 to atmosphere via clearances 10a between piston 10 and retaining member 41.

As can clearly be seen from FIG. 4, the portions of diaphragms 22 and 23 are provided with axially extending flutes 22c and 23c which promote communication between working chamber 20 and the associated overflow chamber 26 and 27. Flow around sealing member 40 when lips 46 and 47 are not sealing is facilitated by flutes 46a and 47a in sealing member 40.

Figure 6:
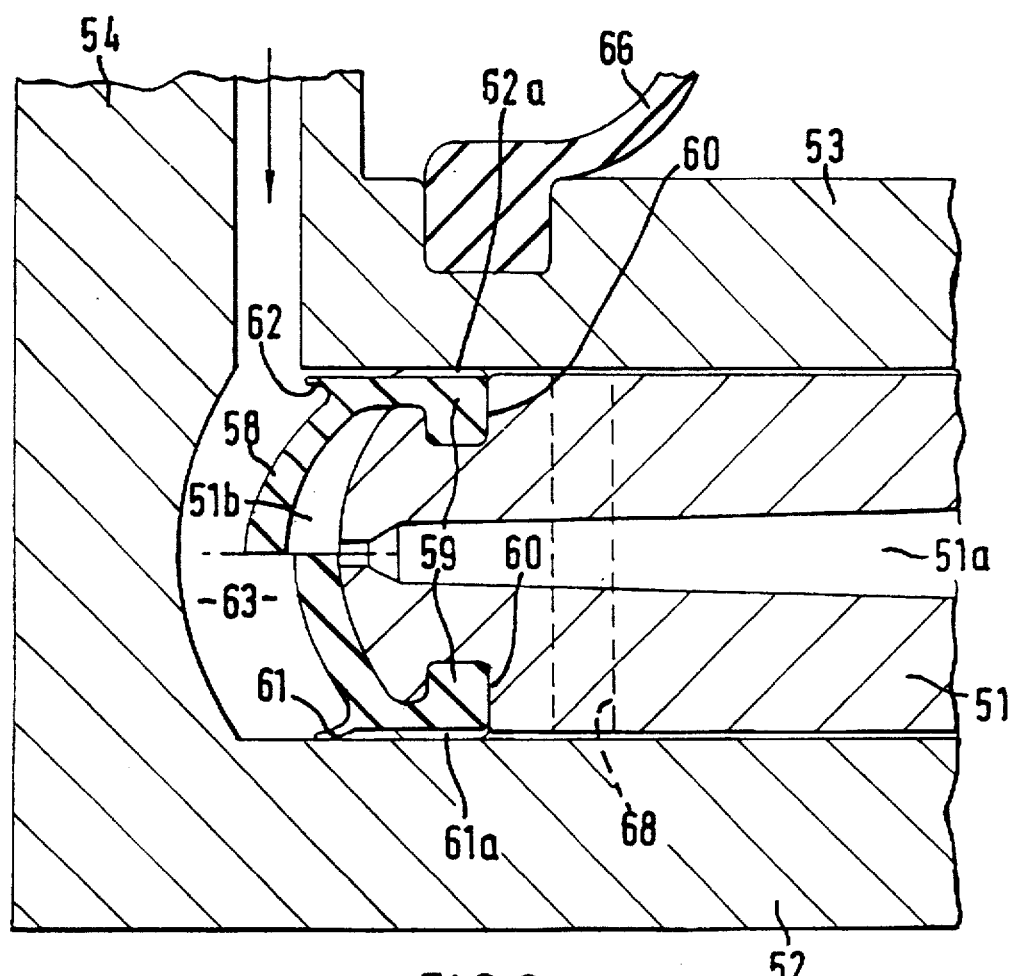
FIG. 6 is an enlarged view of the sealing/valve arrangement used in FIG. 5.
Figure 5:
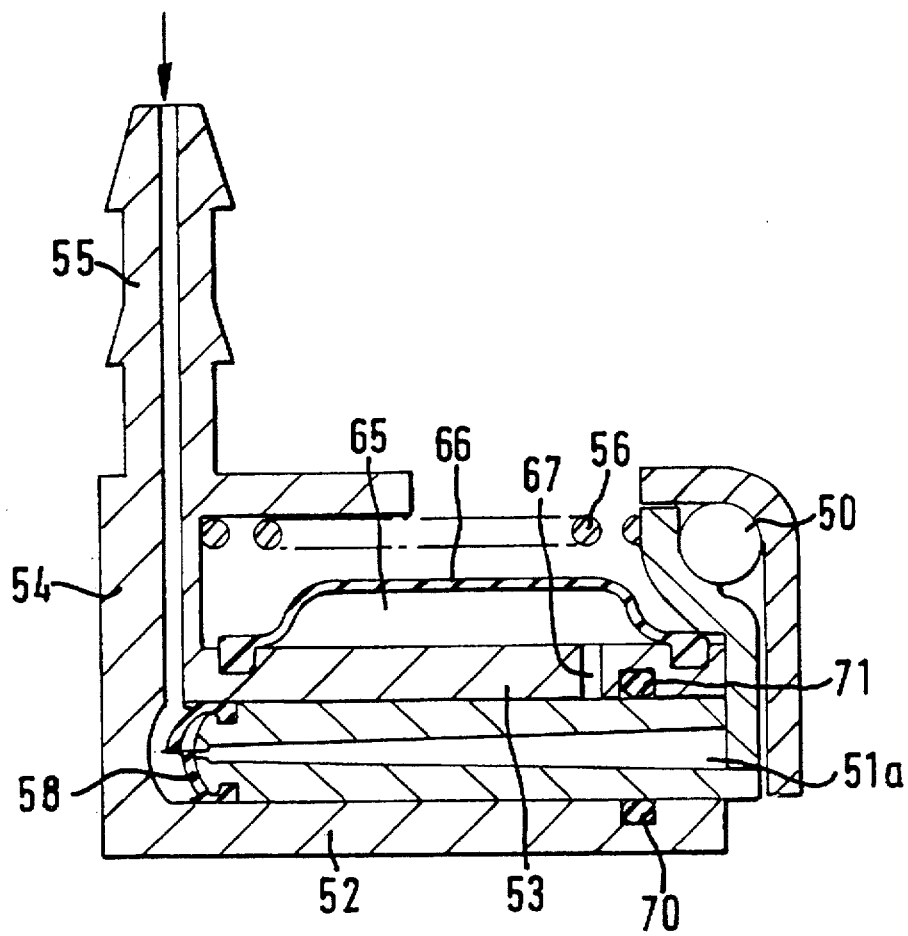
FIG. 5 is a radial section through an alternative clutch actuator according to the invention which is constructed largely from plastics material.
Figure 5:
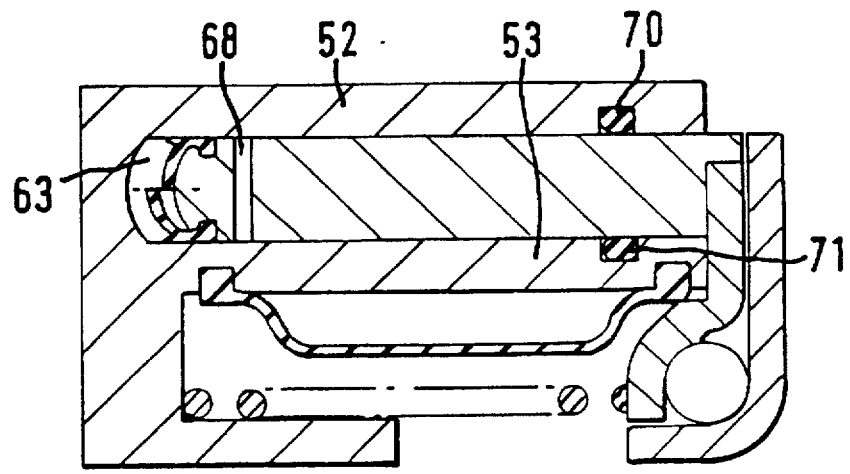

FIGS. 5 and 6 show an alternative actuator construction which is manufactured primarily from plastics material and in which the clutch release bearing 50 is carried on an annular plastics piston 51 which is axially displaceable between inner and outer cylinder walls 52 and 53 respectively. Walls 52 and 53 are formed integrally with a main body portion 54 of the actuator which also includes an integral fluid inlet 55.

A compression spring 56 again acts between the release bearing 50 and the main body portion 54 of the actuator to provide the desired diaphragm spring pre-load.

Piston 51 carries annular sealing member 58 (see FIG. 6) which has retaining lobes 59 which engage in grooves 60 in the piston. Sealing member 58 includes sealing lips 61 and 62 for engagement with the inner and outer cylinder portions 52 and 53 respectively. The upper portion of FIG. 6 shows lip 62 in its unpressurised condition in which flow is possible from working chamber 63 down the clearances between piston 51 and cylinder members 52 and 53 into an overflow chamber 65 defined between a diaphragm 66 and the outer cylinder member 53. Communication between working chamber 63 and overflow chamber 65, as indicated above, is via the clearances between piston 51 and the cylinder members 52 and 53 and also via passageway 67 provided in outer cylinder member 53 and cross drillings 68 in piston 51. Secondary annular seals 70 and 71 seal the outer ends of the clearances between piston 51 and cylinder members 52 and 53.

Again flow around the sealing member 58 when the lips 61 and 62 are not sealing is facilitated by flutes 61a and 62a formed in the sealing member 58.

When working chamber 63 is pressurised sealing member 58 is deflected to the position shown in the bottom half of FIG. 6 in which the lips 61 and 62 seal against the cylinder members 52 and 53 to cut-off communication with the overflow chamber 65. The ability of sealing member 58 to deflect is ensured by passage 51a in piston 51 which connects chamber 51b behind sealing member 58 with atmosphere.

Figure 7:
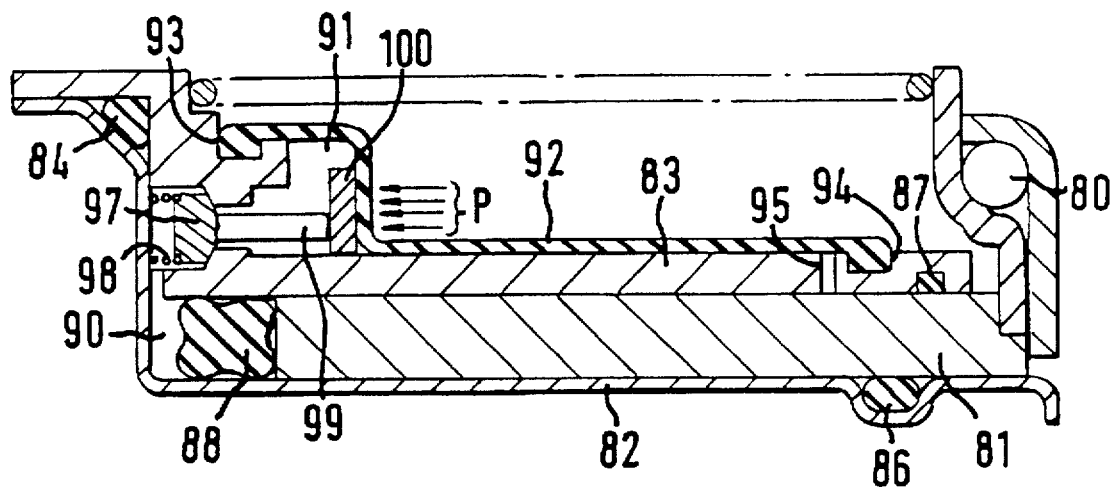
FIG. 7 is a radial section through a further alternative clutch actuator which employs a separate return valve.
Figure 7:
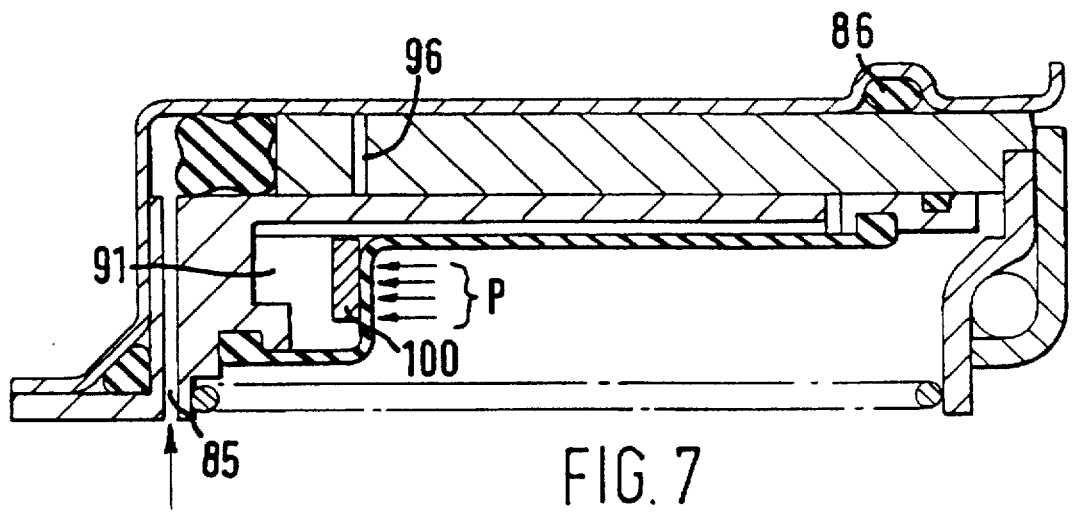

FIG. 7 shows a further actuator construction in which both metals and plastics materials are used. In this construction a clutch release bearing 80 is secured on an annular plastics piston 81 which is axially displaceable between an inner metal cylinder wall 82 and an outer plastics cylinder wall 83. Walls 82 and 83 are sealed together by a seal 84 and wall 83 includes an integral fluid inlet 85.

Piston 81 is sealed at the bearing end to walls 82 and 83 by seals 86 and 87 respectively. A main seal 88 acts as the primary seal for working chamber 90. An overflow chamber 91 is defined by a diaphragm 92 whose natural shape is as shown in FIG. 7. The ends of the diaphragm 92 are received in grooves 93 and 94 provided in outer plastics cylinder wall 83. Any fluid which leaks past main seal 88 is fed to overflow chamber 91 via drillings 95 and 96.

Fluid within overflow chamber 91 can be returned to working chamber 90 and hence to fluid inlet 85 via a one way valve 97. Valve 97 is lightly loaded to its closed position by spring 98 and is opened either by the occurrence of a depression in working chamber 90 and/or by force applied to the stem 99 of valve 97 by a ring 100 as a result of atmospheric pressure acting on diaphragm 92 as indicated by arrows P in FIG. 7.

Thus FIG. 7 is an example of a construction in which the valve means which controls communication with the overflow chamber 91 does not form part of the main seal 88.

All the actuators described above may form part of a pre-filled clutch hydraulic system of the form described in, for example, earlier U.S. Pat. Nos. 4,407,125, 4,599,860, 4,624,290 and 5,113,657 in which the system is pre-filled with hydraulic fluid before being fitted on the associated vehicle. Alternatively the actuators may be filled after mounting on the vehicle.

The actuators are conveniently filled by being subjected to a vacuum to evacuate air followed by the introduction of hydraulic fluid under pressure. The presence in each actuator shown in FIGS. 1 to 3 or 4 or 5 or 6 of passages 10a which admit atmospheric pressure to chamber 10b helps to ensure that valve member 15 assume its open position so that flow path X is maintained open during the filling process thus ensuring that the overflow chambers are fully evacuated and filled.

In the FIG. 7 construction valve 97 is held open during filling both by the depression created in the working chamber 90 during evacuation of air and by the atmospheric pressure P acting on diaphragm 92 and hence on valve stem 99 via ring 100 during the initial introduction of hydraulic fluid under pressure.

We claim:

1. An actuator having an annular piston which defines an annular working chamber in combination with a co-operating cylinder walls, the piston being axially displaceable relative to the cylinder walls by pressurization of fluid within the working chamber, sealing means for sealing the piston to the cylinder walls, an overflow chamber which retains any fluid which leaks past the sealing means from the working chamber, the sealing means allowing communication between the working and overflow chambers when the piston is not undertaking a working stroke to return fluid from the overflow chamber to the working chamber and being deflected by pressurized fluid in the working chamber during a working stroke of the piston to close off communication between the working chamber and the overflow chamber.

2. An actuator according to claim 1 in which the annular piston is displaceable between inner and outer cylinder walls and an annular sealing means contacts said walls to seal the working chamber and is axially displaceable relative to the piston when the working chamber is pressurised to move the piston, said axial movement of the sealing means closing-off communication between the working and overflow chambers.

3. An actuator according to claim 1 in which the annular piston is displaceable between inner and outer cylinder walls and the sealing means has inner and outer sealing lips which are pressed against the co-operating inner and outer walls respectively when the working chamber is pressurised thus sealing the working chamber and also to cutting off communication between the working and overflow chambers.

4. An actuator according to claim 1 in which the overflow chamber is defined by diaphragm means in combination with the cylinder walls.

5. An actuator according to claim 4 in which the piston is displaceable between inner and outer cylinder walls with one diaphragm extending between the piston and the inner cylinder wall and a second-diaphragm extending between the piston and the outer cylinder wall.

6. An actuator according to claim 4 in which the piston is displaceable between inner and outer cylinder walls and the overflow chamber is defined by the diaphragm means and a portion of the outer cylinder wall, passageway means being provided to direct any fluid which leaks past the sealing means to the overflow chamber.

7. An actuator according to claim 6 in which the piston and cylinder walls are made from plastics material.

8. An actuator according to claim 1 in which the piston is displaceable between inner and outer cylinder walls and the overflow chamber is defined by a space means being located between a diaphragm means and a portion of the outer cylinder wall, passageway means being provided to direct any fluid which leaks past the sealing means to the overflow chamber.

9. An actuator according to claim 8 in which rotation of the piston relative to the cylinder wall is prevented by a guide means which is operatively associated with the piston and which engages an anti-rotation formation associated with the cylinder walls.

10. An actuator according to claim 8, in which a return means comprises valve means separate from the sealing means, said valve means being arranged to be normally biased to a closed position but being opened on a return stroke of the piston following the working stroke.

* * * * *